United States Patent [19]

Emmons et al.

[11] Patent Number: 4,561,066
[45] Date of Patent: Dec. 24, 1985

[54] CROSS PRODUCT CALCULATOR WITH NORMALIZED OUTPUT

[75] Inventors: Daniel R. Emmons; William E. Swanson, both of San Diego, Calif.

[73] Assignee: GTI Corporation, San Diego, Calif.

[21] Appl. No.: 505,902

[22] Filed: Jun. 20, 1983

[51] Int. Cl.$^4$ ............................................. G06F 7/52
[52] U.S. Cl. .................................. 364/736; 364/754
[58] Field of Search ............... 364/736, 754, 755, 756, 364/757

[56] References Cited

U.S. PATENT DOCUMENTS

| 3,900,723 | 8/1975 | Bethany et al. | 364/736 |
| 4,202,039 | 5/1980 | Epenoy et al. | 364/757 |
| 4,270,181 | 5/1981 | Tanakura et al. | 364/736 |
| 4,354,249 | 10/1982 | King et al. | 364/754 |
| 4,493,048 | 1/1985 | King et al. | 364/754 |

Primary Examiner—David H. Malzahn
Attorney, Agent, or Firm—Morland C. Fischer

[57] ABSTRACT

A cross product calculator to multiply mathematical representations of a pair of vectors in order to calculate a resultant vector, which resultant vector is aligned normal to the plane in which the pair of vectors is located. The present cross product calculator has application to a real time computer generated imagery or graphics system having the capability to provide reliable color shading of a three dimensional object moving across the screen of a video display. The resultant normal vector provided by the cross product calculator is indicative of the orientation of the object relative to a source of supply of incident light. Storage apparatus and control hardware are included to provide accurate, normalized equivalents of the mathematical representations of the pair of vectors which are multiplied together to derive the cross product thereof. More particularly, a plurality of multiple bit data strings, representing intermediate products of the pair of vectors, are reduced in size without suffering a corresponding loss of information content, so that the resultant cross product (i.e. normal vector) can be calculated with increased speed and minimized data storage requirements.

16 Claims, 7 Drawing Figures $$\vec{P} = \vec{S} \times \vec{T}$$
$$\vec{S} = \overrightarrow{b-a}$$
$$\vec{T} = \overrightarrow{b-c}$$

CROSS PRODUCT CALCULATOR WITH NORMALIZED OUTPUT

BACKGROUND OF THE INVENTION

As will be known to those skilled in the art, conventional computer generated imagery or graphics systems are capable of displaying pictures of three dimensional objects, which objects are typically defined by a plurality of mathematical elements, such as polygons, or other higher order surfaces. Certain real time computer graphics systems are capable of providing color shading of the object (relative to a source of supply of incident light) as the object moves across the screen of a video display. However, in order to realistically and accurately portray a color shaded, three dimensional object, knowledge of certain inherent characteristics is required regarding the object and the incident light supply. More particularly, the shading for a three dimensional object depends upon the color of the polygons thereof before shading, the direction of a supply of incident light, and the orientation of each polygon relative to the direction of the incident light.

The color of the polygons before shading and the direction of the supply of incident light is relatively easily ascertainable. However, the orientation of each polygon relative to the direction of the incident light often requires numerous calculations and considerable numbers of processing apparatus. That is, the orientation of each polygon is commonly calculated by first deriving a vector which is normal to either a light receiving face of the polygon or the plane in which the polygon lies. Such normal vector is typically obtained by calculating the cross product of two adjacent side vectors which designate the light receiving face of the polygon. In the usual case, where each vector is represented by pluralities of multiple (e.g. sixteen) bit numbers, the resultant cross product is represented by a series of data strings of 32 or more bits in length. Thus, as a consequence of the lengthy data strings (indicative of the vector cross product), conventional apparatus by which to calculate the cross product and accommodate the multiple bit data strings has heretofore been characterized by increased throughput delay and relatively complex and extensive processing (e.g. storage and control) hardware.

In order to avoid the aforementioned characterizations, it has sometimes been common to process only a representative portion or chunk of each different data string. Such a chunk of data is typically selected from a data string in an arbitrary fashion, and the least significant bits thereof are, consequently, often disregarded. Accordingly, while the performance of the processing hardware may be enhanced, the accuracy and precision of the information content of the data strings is undesirably reduced.

No patent is known which discloses or suggests a method and apparatus for optimizing both the precision and size of a plurality of data strings (e.g. utilized in the calculation of a vector cross product) by selectively normalizing a plurality of such data strings relative to one another, so as to accurately and efficiently provide color shading to a three dimensional object relative to the position of the object to a supply of incident light. However, reference may be made to one or more of the following U.S. Patents which generally disclose processing systems, wherein certain groupings of binary bits are deleted from a data string to speed up a processing (e.g. multiplication) operation:

| Patent No. | Issue Date |
|---|---|
| 3,192,363 | June 25, 1965 |
| 4,173,789 | November 6, 1979 |
| 4,276,607 | June 30, 1981 |

SUMMARY OF THE INVENTION

Briefly, and in general terms, a cross product calculator is disclosed having particular application to a real time computer generated imagery or graphics system for providing color shading of a three dimensional object moving across the screen of a video display. The output of the cross product calculator represents a vector aligned normal to a light receiving face of a polygon, a number of which polygons define the object to be displayed. Two vectors which form a pair of adjacent sides of the light receiving face of the polygon are multiplied together in order to calculate the resultant vector which is normal to the plane of the polygon. The normal vector is indicative of the orientation of the polygon, the knowledge of which is necessary to provide reliable color shading of the object relative to a source of supply of incident light. The resultant normal vector is derived by processing a plurality of multiple (e.g. 32 or more) bit data strings which are provided by the cross product calculator from mathematical representations of the two side vectors to be multiplied together. Storage apparatus and associated control logic are included by which to normalize each of the plurality of data strings relative to one another. That is, a particular segment (e.g. sixteen bits) of each data string is selected for continued processing through the cross product calculator. The selection of each data string segment is dependent upon the bit pattern thereof and, more particularly, upon the occurrence of a pair of successive bits of opposite polarity relative to one another. Accordingly, in the event that many strings of data contain respective bit patterns wherein a large number of the most significant bits are all of the same polarity, the data strings are normalized or shifted by an identical number of bit positions, so that some of the most and/or least significant bits thereof are discarded, whereby the data strings are scaled to provide representative data words of reduced size while maximizing precision. By virtue of the foregoing normalization process, the control hardware and storage apparatus utilized, as well as the corresponding cost therefor, may be minimized, while the speed of the cross product calculator of the present invention may be enhanced relative to conventional cross product calculators.

DESCRIPTION OF THE PREFERRED EMBODIMENT

Figure 1:
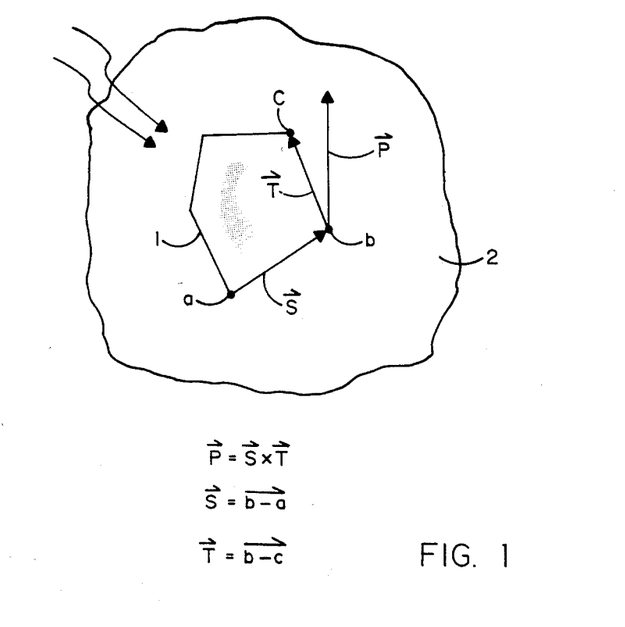
FIG. 1 shows a polygon and a vector P normal to a light receiving face of the polygon, which normal vector is calculated by the present cross product calculator by multiplying together mathematical representations of two adjacent side vectors $\bar{S}$ and $\bar{T}$ which designate the light receiving face of the polygon.

A computer generated imagery or graphic system requires certain input data before realistic color shading can be provided to a three dimensional object moving across the screen of an associated video display. One such required piece of information is the orientation of the polygons which form the object relative to the direction of a source of supply of incident light. Referring to FIG. 1 of the drawings, a light receiving face of a polygon 1 is shown lying in a plane 2. Polygon 1 is one of a plurality of polygons which forms an object to be displayed by a computer graphics system. The light receiving face of polygon 1 is defined by a number of vertices and a corresponding number of side vectors which extend between the vertices. By way of example, two such adjacent side vectors, identified below as $\vec{S}$ and $\vec{T}$, are connected to one another and designated $\overline{b-a}$ and $\overline{b-c}$, respectively, corresponding to the vertices of polygon 1.

The orientation of polygon 1 may be computed by deriving a vector, identified below as $\vec{P}$, which is normal to both the light receiving face of polygon 1 and to the plane 2 thereof. The normal vector $\vec{P}$ may be derived by calculating the cross product of the two side vectors $\vec{S}$ and $\vec{T}$ which lie in the plane 2 and define polygon 1.

As will be known to those skilled in the art, side vector $\vec{S}$ of FIG. 1 can be represented by well-known homogeneous coordinates (x, y, z and w) in three dimensional space as follows:

$$\vec{S} = \vec{b-a} \tag{1}$$

$$= \left(\frac{bx}{bw}, \frac{by}{bw}, \frac{bz}{bw}\right) - \left(\frac{ax}{aw}, \frac{ay}{aw}, \frac{az}{aw}\right) \tag{2}$$

$$= \left(\frac{bx}{bw} - \frac{ax}{aw}, \frac{by}{bw} - \frac{ay}{aw}, \frac{bz}{bw} - \frac{az}{aw}\right) \tag{3}$$

$$= \frac{1}{aw \cdot bw}(bx \cdot aw - ax \cdot bw, by \cdot aw - \tag{4}$$

$$ay \cdot bw, bz \cdot aw - az \cdot bw)$$

It has been recognized by the inventors herein that each of the coordinates of the parenthesized triplet in Equation 4 may be expressed in terms of a 2×2 determinant. Accordingly, $$\vec{S} = \left(\begin{vmatrix} bx & ax \\ bw & aw \end{vmatrix}, \begin{vmatrix} by & ay \\ bw & aw \end{vmatrix}, \begin{vmatrix} bz & az \\ bw & aw \end{vmatrix}, bw \cdot aw\right), \tag{5}$$

where $\begin{vmatrix} bx & ax \\ bw & aw \end{vmatrix} = Sx$, $\begin{vmatrix} by & ay \\ bw & aw \end{vmatrix} = Sy$, and $\begin{vmatrix} bz & az \\ bw & aw \end{vmatrix} = Sz$.

Similarly, side vector T of FIG. 1 can also be correspondingly represented by homogeneous coordinates in three dimensional space as follows:

$$\vec{T} = \vec{c-b} \tag{6}$$

$$= \left(\begin{vmatrix} cx & bx \\ cw & bw \end{vmatrix}, \begin{vmatrix} cy & by \\ cw & bw \end{vmatrix}, \begin{vmatrix} cz & bz \\ cw & bw \end{vmatrix}, cw \cdot bw\right), \tag{7}$$

where $\begin{vmatrix} cx & bx \\ cw & bw \end{vmatrix} = Tx$, $\begin{vmatrix} cy & by \\ cw & bw \end{vmatrix} = Ty$, and $\begin{vmatrix} cz & bz \\ cw & bw \end{vmatrix} = Tz$.

Inasmuch as the direction and not the magnitude of the normal vector $\vec{P}$ is required, the terms bw·aw and cw·bw, which are arbitrary factors which scale the normal vector, may therefore be eliminated from the aforementioned cross product calculations. Accordingly, the cross product $\vec{P} = \vec{S} \times \vec{T}$ is represented as follows:

$$\vec{P} = \begin{vmatrix} i & j & k \\ Sx & Sy & Sz \\ Tx & Ty & Tz \end{vmatrix} \tag{8}$$

$$= \begin{vmatrix} Sy & Sz \\ Ty & Tz \end{vmatrix}, - \begin{vmatrix} Sx & Sz \\ Tx & Tz \end{vmatrix}, \begin{vmatrix} Sx & Sy \\ Tx & Ty \end{vmatrix} \tag{9}$$

$$= (Px, Py, Pz), \text{ which is expanded to} \tag{10}$$

$$= (Sy \cdot Tz - Sz \cdot Ty, - \tag{11}$$
$$(Sx \cdot Tz - Sz \cdot Tx), Sx \cdot Ty - Sy \cdot Tx).$$

Figure 2:
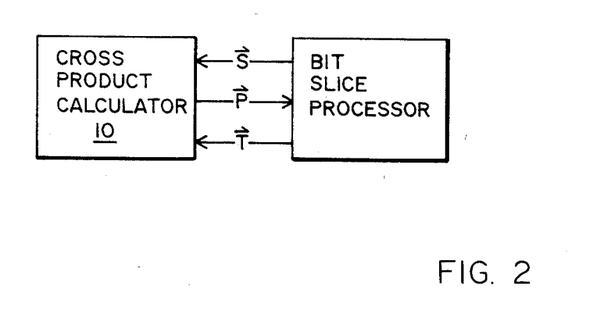
FIG. 2 is representative of the cross product calculator of the present invention.
Figure 3:
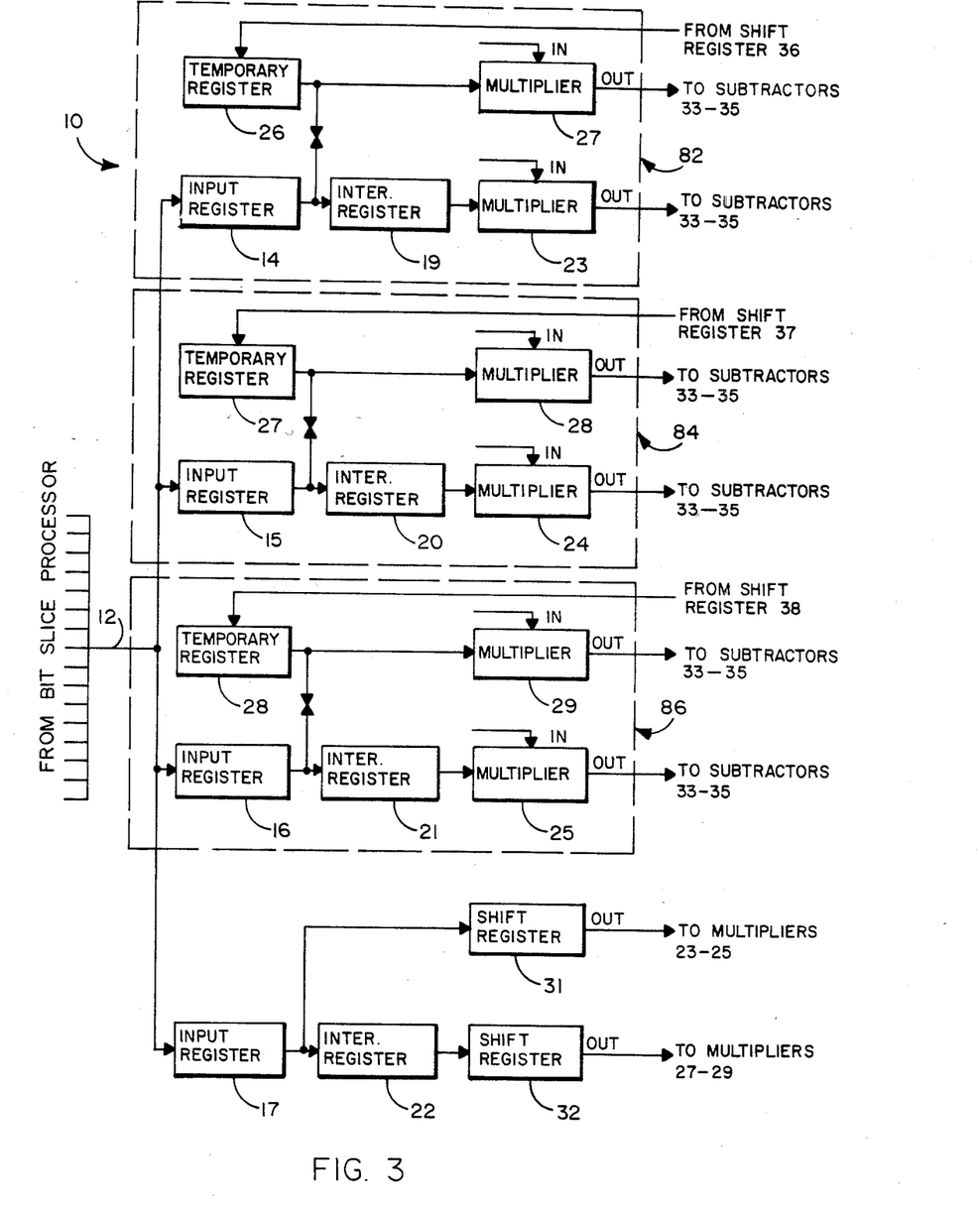
FIG. 3 is a block diagram showing a plurality of multiplier stages which form a portion of the present cross product calculator.
Figure 4:
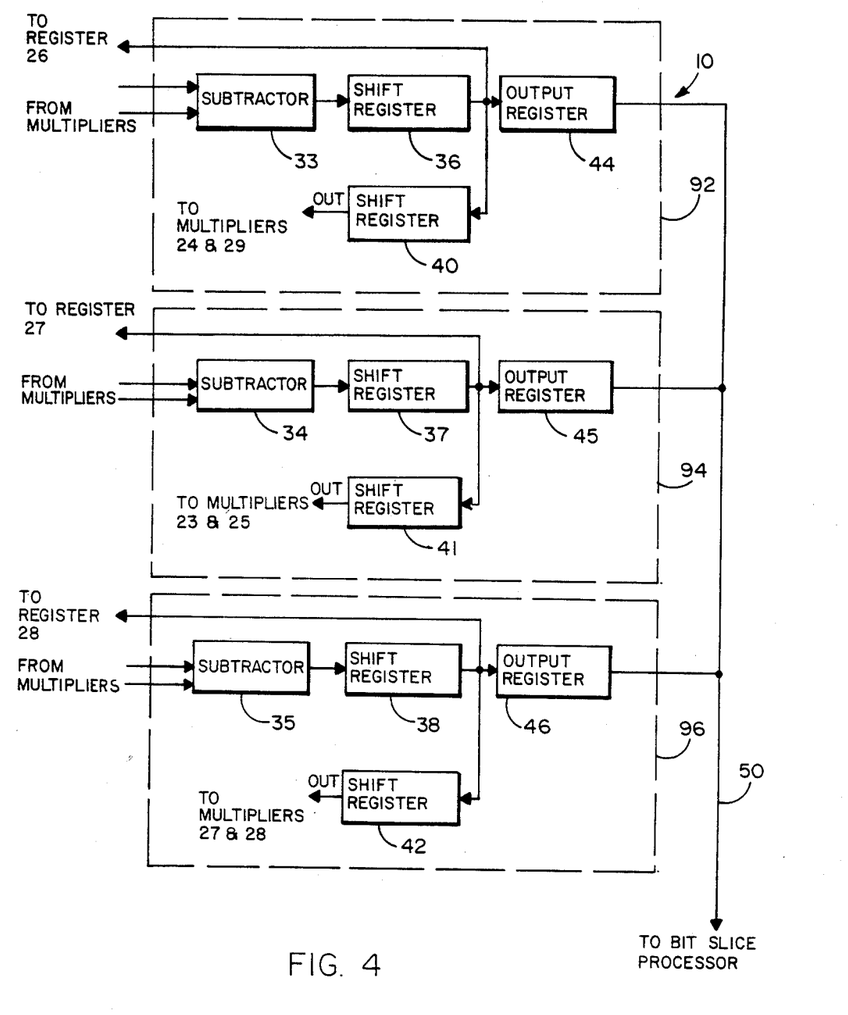
FIG. 4 is a block diagram showing a plurality of output stages which are interconnected with the multiplier stages of FIG. 3 to form the present cross product calculator.

A cross product calculator 10 having application to a computer graphics system to perform the cross product $\vec{P} = \vec{S} \times \vec{T}$ is shown diagrammatically in FIG. 2 of the drawings. A block diagram which is representative of a circuit to implement cross product calculator 10 is shown in FIGS. 3 and 4 of the drawings. The cross product calculator 10 comprises three identical multiplier stages 82, 84 and 86 interconnected with three identical output stages 92, 94 and 96. Although not essential to the operation thereof, cross product calculator 10 is, in a preferred embodiment, interfaced with a conventional bit slice processor (not shown) by way of a sixteen line input data bus 12. By way of example, the bit slice processor herein described may be implemented as a high speed computer comprising four 2901 microelectronic chips cascaded together to control the transfer of information to and from cross product calculator 10 and to initiate and terminate each of the soon to be described data passes through calculator 10. When utilized herein, the bit slice processor is typically controlled by a suitable computer program in a microcoded format. Sixteen bit words are supplied from the bit slice processor via input data bus 12 to each of four input registers 14, 15, 16 and 17. Each of the input registers 14–17 is preferably a two chip set comprising a pair of 74F374 microelectronic chips cascaded together. Input registers 14–16 form respective ones of the aforementioned three identical multiplier stages 82, 84 and 86, which multiplier stages will now be described while referring to FIG. 3.

Each multiplier stage 82, 84 and 86 includes a respective intermediate register 19, 20 and 21. Intermediate registers 19–21 are respectively connected with output terminals of input registers 14–16 by way of corresponding sixteen line sets.

Each intermediate register 19–21 is preferably a two chip set also comprising a pair of 74F374 microelectronic chips cascaded together. A first multiplier 23, 24 and 25 from each multiplier stage is respectively connected with output terminals of intermediate registers 19–21 by way of corresponding sixteen line sets. Each multiplier 23–25 is preferably a two chip set comprising a pair of 25LS14 microelectronic chips cascaded together. First multipliers 23–25 are serial/parallel multipliers. That is, multipliers 23–25 are adapted to receive from intermediate registers 19–21 sixteen bits of information over sixteen data lines. However, the output of each multiplier 23–25 is a serial data string applied one bit at a time over a single data line. Each of the first multipliers 23–25 is provided with respective input terminals (designated IN) to which different signals are supplied which, as will be explained in greater detail hereinafter, are representative of certain ones of the elements in the 2×2 determinants of the hereinabove listed mathematical Equations 5, 7 and 9.

Each multiplier stage 82, 84 and 86 also includes a temporary register 26, 27 and 28. Each temporary register 26–28 is preferably implemented from a two chip set comprising a pair of 74F374 microelectronic chips cascaded together so as to have a sixteen bit capacity. Input terminals of temporary registers 26–28 are respectively interconnected by way of corresponding sixteen line sets with one of three output stages which form the present cross product calculator 10. Output terminals of temporary registers 26–28 are respectively connected to each of an intermediate register 19–21 and to a second multiplier 27, 28 and 29 by way of corresponding sixteen line sets. Each of the second multipliers 27–29 is of identical construction to the previously described first multipliers 23–25. That is, each multiplier 27–29 is a serial/parallel multiplier preferably comprising a pair of 25LS14 microelectronic chips cascaded together for receiving at input terminals IN thereof representations of certain other ones of the elements which form the 2×2 determinants in the mathematical Equations 5, 7 and 9.

Referring once again to input register 17, output terminals thereof are connected to each of an intermediate register 22 and a first shift register 31 by way of corresponding sixteen line sets. Similar to intermediate registers 19–21, intermediate register 22 is preferably implemented by a two chip set comprising a pair of 74F374 microelectronic chips cascaded together. First shift register 31 is preferably implemented by a two chip set comprising a pair of 25LS22 microelectronic chips cascaded together. Output terminals of intermediate register 22 are connected to a second shift register 32 by way of a sixteen line set. Second shift register 32 is identical in construction to first shift register 31. Each of first and second shift registers 31 and 32 has respective output terminals, designated OUT, in order to provide thereat a serial data string, one bit at a time.

Each of the three multiplier stages 82, 84 and 86 of FIG. 3 is respectively interconnected with one of the three identically constructed output stages 92, 94 and 96. Referring to FIG. 4 of the drawings, the three output stages 92, 94 and 96 which form the cross product calculator 10 of the present invention are now described. Each output stage 92, 94 and 96 includes a serial subtractor 33, 34 and 35 which is preferably implemented by one quarter of a 25LS15 microelectronic chip. Each subtractor 33–35 has a pair of input terminals, which pair of terminals is respectively connected to receive the output signals from two of the multipliers 23, 24, 25, 27, 28 and 29 of the multiplier stages 82, 84 and 86 of FIG. 3. Accordingly, and as will be described in greater detail hereinafter, different pairs of the products calculated by the multipliers 23–25 and 27–29 are supplied to subtractors 33–35, wherein such products are subtracted from one another. From Equations 5 and 7, above, it can be observed that the three 2×2 determinants which define each of the vectors $\bar{S}$ and $\bar{T}$ can be expanded by a total of six multiplication operations and three subtraction operations. Accordingly, cross product calculator 10 includes six multipliers 23–25 and 27–29 and three subtractors 33–35.

Each subtractor 33–35 is respectively connected to a first shift register 36, 37 and 38 in order to serially supply multiple bit data strings thereto. Output terminals of shift registers 36–38 are respectively connected via three common sixteen line sets to second shift registers 40, 41 and 42; output registers 44, 45 and 46; and the temporary registers 26–28 which form multiplier stages 82, 84 and 86. Each of the first and second shift registers 36–38 and 40–42 are identical in construction and are preferably implemented by a two chip set comprising a pair of 25LS22 microelectronic chips cascaded together so as to have a sixteen bit capacity. Each of the second shift registers 40–42 has a respective output terminal, designated OUT, which, as will be explained in greater detail hereinafter, provides to multipliers 23–25 and 26–28 representations of certain ones of the elements of the 2×2 determinants in the Equation 9, listed above. Each output register 44–46 is also preferably implemented by a two chip set comprising a pair of 74F374 microelectronic chips cascaded together so as to have a sixteen bit capacity. Output registers 44–46 are respectively connected via corresponding sixteen line sets to a common sixteen line output data bus 50. A total of three output words are supplied from output stages 92, 94 and 96 (i.e. and indicative of the cross product calculated by cross product calculator 10) to bit slice processor 10 via output data bus 50.

As will soon become apparent, each of the resultant products provided at the output terminals OUT of multipliers 23, 24, 25, 27, 28 and 29 of FIG. 2 will be a data string of 32 or more bits in length. Accordingly, each of the corresponding 32 or more bit output data strings provided by subtractors 33–35 (indicative of the difference between different pairs of products from multipliers 23–25 and 27–29) will frequently contain numerous ones or zeros located in the most significant bit positions. As will be recognized by those skilled in the art, such lengthy data strings would undesirably increase the throughput delay and maximize the processing hardware and control logic necessary for a computer graphic system to display a color shaded, three dimensional object moving relative to a supply of incident light.

In order to reduce the size of each of the multiple bit data strings provided by respective subtractors 33-35 without altering the information content thereof, each of the (i.e. three) data strings is normalized (i.e. scaled) relative to one another. More particularly, and referring concurrently to FIGS. 5 and 6 of the drawings, a method and apparatus are disclosed for normalizing the multiple bit data strings being provided to each of the shift registers 36-38 from subtractors 33-35. As previously indicated, a multiple bit data string is serially supplied from a subtractor (e.g. 33) to a corresponding shift register (e.g. 36). The first two lines of the sixteen line set which interconnect shift register 36 with output register 44 are respectively connected to the input terminals of a 2-input exclusive OR gate 60. Accordingly, exclusive OR gate 60 is responsive to the binary levels of the data bits transmitted over the first two data lines between shift register 36 and output register 44. That is, exclusive OR gate 60 senses a condition of the input data string to shift register 36 whereby to determine when two successive bits thereof are of opposite polarity relative to one another (i.e. either a 01 or a 10). As will be disclosed in greater detail hereinafter when referring to FIG. 7, whenever such a bit pattern is sensed in the shift register 36 (or in any of the other two shift registers 37 or 38), the contents of shift registers 36-38 are concurrently loaded into respective sixteen bit output registers 44-46. Any overflow from the shift registers 36-38 of the least significant bits of the three multiple bit data strings is discarded, as successive bits are serially shifted therethrough.

Figure 6:
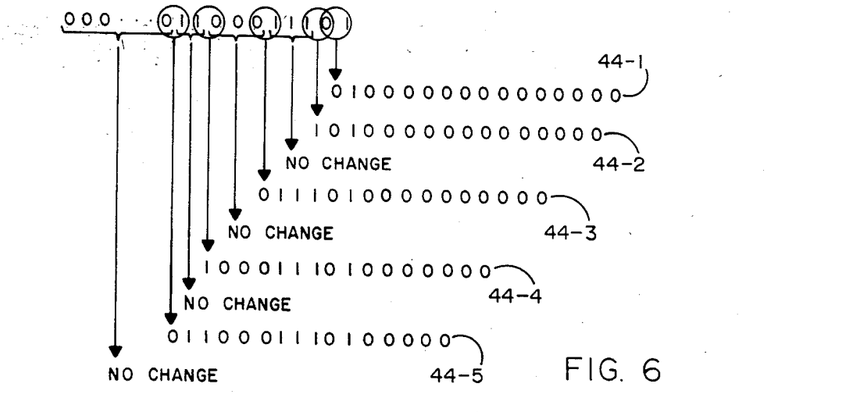
FIG. 6 illustrates an example of a preferred method for normalizing a data string by means of the apparatus of FIG. 5.

An example of the presently disclosed normalization method is provided in FIG. 6 of the drawings. For purposes of the present example, it is assumed that the multiple bit data string being supplied from the subtractor 33 of FIG. 3 to shift register 36 consists of the bit pattern 000...01100011101. Inasmuch as the two least significant bits (01) of the data string sensed by exclusive OR gate 60 are of opposite polarity relative to one another, the contents of shift register 36 are loaded into output register 44 at 44-1. The third bit of the data string of FIG. 6 is of opposite polarity to the second bit thereof (i.e. 10), and the contents of shift register 36 are again loaded into output register 44 at 44-2. However, the next two bits of the data string (i.e. 11) successively sensed by exclusive OR gate 60 are of identical polarity relative to one another and to the aforementioned third bit thereof. Accordingly, the contents of the output register 44 remain unchanged after each of such next two bits is sensed, inasmuch as exclusive OR gate 60 senses a pair of bits of like polarity, such that data will not be transferred from shift register 36 to output register 44. In the event that a succeeding bit (i.e. the sixth least significant bit) of the data string is of opposite polarity (i.e. 01) relative to a preceeding (i.e. fifth) bit thereof, the contents of shift register 36 are once again loaded into output register 44 at 44-3. Likewise, the ninth bit sensed by exclusive OR gate 60 is of opposite polarity to the eighth bit (i.e. 10), and the eleventh bit is of opposite polarity to the tenth bit (i.e. 01), and the contents of shift register 36 are loaded into output register 44 at 44-4 and 44-5 after each of the ninth and eleventh bits are sensed by gate 60.

In the present example of FIG. 6 and for the purpose of simplicity, it is assumed that each bit remaining in the multiple bit data string (i.e. 00...00) is of identical polarity relative to one another (and to the aforementioned eleventh bit). Hence, and as previously disclosed, the contents of the output register 44 remain unchanged after each of such remaining bits is serially propagated through shift register 36 and sensed by the exclusive OR gate 60, and no additional data is transferred from shift register 36 to output register 44.

The sixteen bit number stored in output register 44 after the multiple bit data string is serially propagated through shift register 36 is the normalized output from the subtractor 33 of the first output stage 92 of FIG. 4. That is, the last sixteen bit number loaded into output register 44 from shift register 36 is one of a total of three normalized numbers provided output stages 92, 94 and 96. In the present example of FIG. 6 the sixteen bit normalized number stored in output register 44 (at 44-5) consists of the bit pattern 0110001110100000. Accordingly, the normalized number stored in output register 44 provides an accurate and compact sixteen bit representation of the approximately 32 or more bit serial data string that is supplied to shift register 36 from subtractor 33.

Figure 7:
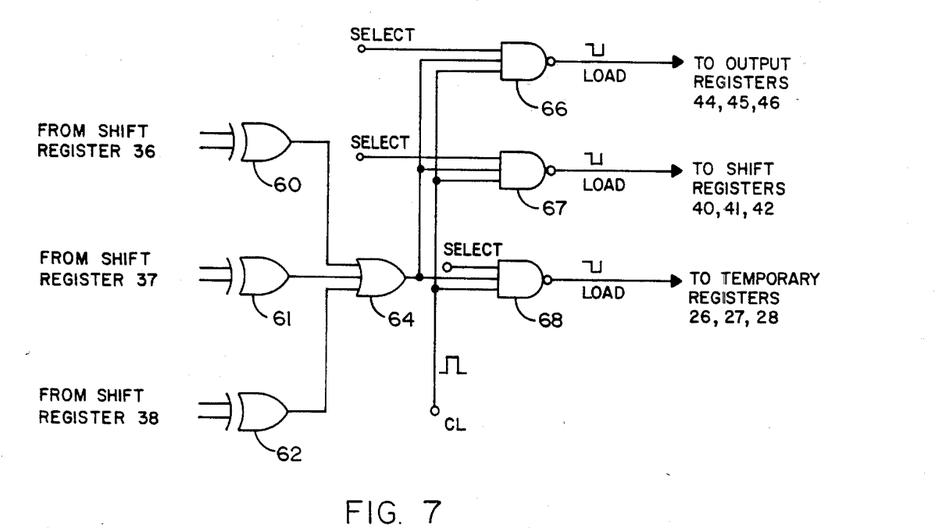
FIG. 7 illustrates logic for controlling the operation of the apparatus of FIG. 5 for normalizing a plurality of multiple bit data strings.

However, and as was previously described, each output stage 92, 94 and 96 of cross product calculator 10 includes a respective subtractor 33, 34 and 35. Therefore, and as was also previously indicated, three pairs of shift registers 36-38 and corresponding output registers 44-46 are utilized in calculator 10 to accommodate respective multiple bit serial data strings from each of the subtractors 34-36. Referring now to FIG. 7 of the drawings, logic is shown by which to synchronously control the operation of the three pairs of shift registers 36-38 and output registers 44-46 of FIG. 4, whereby to cause each of the three strings of data from respective subtractors 33-35 (representative of the differences between pairs of products calculated by multipliers 23-25 and 27-29) to be normalized relative to one another. More particularly, each pair comprising a shift register and output register 36, 44 and 37, 45 and 38, 46 of FIG. 4 has a respective 2-input exclusive OR gate 60, 61 and 62 associated therewith in an identical fashion to the connection of exclusive OR gate 60 between registers 36 and 44, as earlier described when referring to FIG. 5. The input terminals of each exclusive OR gate 60-62 of FIG. 7 are respectively connected to the first two of sixteen data lines which connect a shift register 36-38 to an associated output register 44-46 in FIG. 4.

Output terminals of each of the three exclusive OR gates 60-62 are connected to a conventional 3-input OR gate 64. The output terminal of an exclusive OR gate 60-62 is driven to a relatively HI logic level whenever, as previously indicated, a condition is sensed from a respectively connected shift register 36-38 that two successive bits of a serial data string supplied thereto are of opposite polarity relative to one another. As will be known to those skilled in the art, the output terminal of OR gate 64 is driven to a relatively HI logic level whenever the output terminal of at least one exclusive OR gate 60-62 is also driven to a relatively HI logic level. The output terminal of OR gate 64 is connected to one input terminal of a conventional 3-input NAND gate 66. A second input terminal of NAND gate 66 is connected to a recurring source of clock pulses, designated CL. The third input terminal of NAND gate 66 is connected to a source of control signals, designated SELECT. The output terminal of NAND gate 66 is driven to a relatively LO logic level whenever a clock pulse CL is provided at one of the input terminals thereof at the same time as a second of the input terminals is driven to a relatively HI logic level by a SELECT control signal and the third input terminal is driven to a relatively HI logic level (via the output terminal of OR gate 64), so as to indicative of a data string bit pattern suitable to cause normalization. NAND gate 66 is connected to each of the output registers 44-46 to supply a LOAD control signal thereto for causing the contents of each shift register 36-38 to be loaded into its associated output register 44-46 during the transition of such control signal from a LO to a HI logic level.

Accordingly, when any of the multiple bit data strings provided by subtractors 33-35 of output stages 92, 94 and 96 contains a bit pattern including two successive bits of opposite polarity, at least one of the exclusive OR gates 60-62 will be driven to an output state which is sufficient to cause the generation of the LOAD control signal and the subsequent loading into output registers 44-46 of respective sixteen bit representations of the multiple (e.g. 32 or more) bit data strings. Inasmuch as the LOAD control signal is provided whenever the exclusive OR gates 60-62 sense the aforementioned condition in any one or more of the total of three data strings, such condition to cause the loading of data between one pair of shift and output registers is sufficient to concurrently cause the loading of data between all of the other pairs of shift and output registers. Thus, after each of the multiple bit data strings is propagated through respective shift registers 36-38, output registers 44-46 will respectively contain sixteen bit numbers which are normalized relative to one another (i.e. which are the resultant of the same number of data transfers from shift registers 36-38 to associated output registers 44-46).

Thus, the output data strings from the three subtractors 33-35 of output stages 92, 94 and 96 are normalized and stored in output registers 44-46. By virtue of the foregoing normalization process, each of the three multiple bit data strings provided by respective subtractors 33-35 is shifted or scaled by an identical amount, so as to provide representative sixteen bit data words of reduced size (i.e. relative to the 32 or more bit data string) and maximized precision. The three sixteen bit words are supplied from output registers 44-46 to the bit slice processor by way of the sixteen line output data bus 50, and the multiplier stages 82, 84 and 86 of cross product calculator 10 are ready to receive additional input data from the bit slice processor by which to calculate the cross product $\vec{P} = \vec{S} \times \vec{T}$.

In order to calculate the vector cross product $\vec{P} = \vec{S} \times \vec{T}$, a total of three data passes are made through each of the multiplier stages 82, 84 and 86 and output stages 92, 94 and 96 of cross product calculator 10. As will soon be explained, three data passes are required in order to minimize the hardware by which to implement cross product calculator 10. It is to be understood that the hereinabove described interaction between shift registers 36-38 and output registers 44-46 represents the transfer and normalization of multiple bit data strings in cross product calculator 10 during only one of such three data passes. Accordingly, and as will also be explained, shift registers 36-38 selectively interact with either output registers 44-46 or temporary registers 26-28 or shift registers 40-42, via a common sixteen line set, to transfer normalized multiple bit data strings thereto during respective ones of such three data passes. The normalization of the multiple bit data strings and the loading of accurate sixteen bit representations thereof from shift registers 36-38 into either of temporary registers 26-28 or shift registers 40-42 during respective data passes is accomplished in an identical manner to that described for output registers 44-46, while referring to FIGS. 5-7 of the drawings. That is, exclusive OR gates 60-62 are also interconnected with the first two of the sixteen common lines which interconnect each of shift registers 36-38 with respective ones of the temporary registers 26-28 and shift registers 40-42, so as to be responsive to the binary level of the multiple bit data strings being supplied to shift registers 36-38 during different data passes through calculator 10.

Referring once again to FIG. 7, additional control logic comprising 3-input NAND gates 67 and 68 (similar to the previously disclosed NAND gate 66) is interconnected between shift registers 36-38 and each of shift registers 40-42 (to control the loading of data therein during one data pass through calculator 10) and temporary registers 26-28 (to control the loading of data therein during another data pass through calculator 10). More particularly, the output terminal of OR gate 64 is also connected to one input terminal of each of NAND gates 67 and 68. Second input terminals of each of NAND gates 67 and 68 are connected to the source of clock pulses CL. Third input terminals of each of NAND gates 67 and 68 are connected to the source of control signals SELECT. The output terminal of only one of NAND gates 67 or 68 is selectively driven to a relatively LO logic level whenever a clock pulse CL is provided at one of the input terminals thereof at the same time that a second of the input terminals is driven to a relatively HI logic level (via OR gate 64) and a third of the input terminals is also driven to a relatively HI logic level by a SELECT control signal. The bit slice processor supplies a SELECT control signal to only one of the NAND gates 66-68 during any one of the three data passes through cross product calculator 10, so that the aforementioned LOAD control signal is provided at the output terminal of only one such NAND gate 66 or 67 or 68. Accordingly, whenever a predetermined condition is sensed in a multiple bit data string at any of the shift registers 36-38, where two successive bit thereof are of opposite polarity relative to one another, a LOAD control signal is generated by one of NAND gates 66-68, whereby the contents of shift registers 36-38 are concurrently loaded into either of temporary registers 26-28 during one data pass through cross product calculator 10, or shift registers 40-42 during a second data pass through calculator 10, or output registers 44-46 during a third data pass through calculator 10.

The operation of the presently described cross product calculator 10 is now disclosed in detail while referring concurrently to FIGS. 3 and 4 of the drawings. Each vector $\vec{S}$ and $\vec{T}$ to be supplied to and multiplied together by cross product calculator 10 is represented by a total of eight sixteen bit numbers. More particularly, each vector $\vec{S}$ and $\vec{T}$ is represented by two points (b-a and b-c). Inasmuch as each vector is represented in homogeneous coordinates (x, y, z, w), each of the two points is represented by a group of four numbers, with each number containing sixteen bits of data. Therefore, vectors $\vec{S}$ and $\vec{T}$ are each represented by two groups of four sixteen bit numbers. The output of cross product calculator 10 (indicative of the normal vector $\vec{P}$) is represented by a total of three sixteen bit numbers supplied one at a time from respective output stages 92, 94 and 96 to the bit slice processor via output data bus 50.

During a first data pass through cross product calculator 10, a first set of sixteen bit words, designated ax, ay, az and aw and representative of a first of the two points which defines vector $\bar{S}$, is supplied from the bit slice processor to respective input registers 14-17. The bit slice processor next provides a second set of sixteen bit words, designated bx, by, bz and bw and representative of both the second point which defines vector $\bar{S}$ and a first of the points which defines vector $\bar{T}$, to respective input registers 14-17. Accordingly, the first set of sixteen bit words (ax, ay, az and aw) is transferred from input registers 14-16 to respective intermediate registers 19-22. Moreover, the sixteen bit word aw at intermediate register 22 is loaded into shift register 32, and the sixteen word bw at input register 17 is loaded into shift register 31. Shift register 31 supplies the sixteen bit word bw, bit by bit, to respective input terminals IN of multipliers 23-25. Shift register 32 supplies the sixteen bit word aw, bit by bit, to respective input terminals IN of multipliers 27-29.

Hence, during the first pass through cross product calculator 10, multiplier 27 receives input data aw (from shift register 32) and bx (from input register 14). An output data word (designated bx·aw) of approximately 32 bits in length is provided out the output OUT of multiplier 27 and representative of the product of the input data received thereby. Multiplier 23 receives input data bw (from shift register 31) and ax (from intermediate register 19). An output data word (designated ax·bw) of approximately 32 bits in length is provided at the output terminal OUT of multiplier 23 and representative of the product of the input data received thereby. Multiplier 28 receives input data aw (from shift register 32) and by (from input register 15). An output data word (designated by·aw) of approximately 32 bits in length is provided at the output terminal OUT of multiplier 28 and representative of the product of the input data received thereby. Multiplier 24 receives input data bw (from shift register 31) and ay from intermediate register 20. An output data word (designated ay·bw) of approximately 32 bits in length is provided at the output terminal OUT of multiplier 24 and representative of the product of the input data received thereby. Multiplier 29 receives input data aw (from shift register 32) and bz (from input register 16). An output data word (designated bz·aw) of approximately 32 bits in length is provided at the output terminal OUT of multiplier 29 and representative of the product of the input data received thereby. Multiplier 25 receives input data bw (from shift register 31) and az (from intermediate register 21). An output data word (designated az·bw) of approximately 32 bits in length is provided at the output terminal OUT of multiplier 25 and representative of the product of the input data received thereby.

Each of the output data words from the multipliers 23 and 27 is supplied to respective input terminals of subtractor 33. An output data work of approximately 32 bits in length is provided by subtractor 33 and representative of the difference (bx·aw−ax·bw) between the products calculated by multipliers 23 and 27. Accordingly, and referring to Equation No. 5, above, it can be observed that the output data word provided by subtractor 33 is indicative of the solution (designated Sx) of one 2×2 determinant which defines the vector $\bar{S}$ in homogeneous coordinates.

Each of the output data words from multipliers 24 and 28 is supplied to respective input terminals of subtractor 34. An output data word of approximately 32 bits in length is provided by subtractor 34 and representative of the difference (by·aw−ay·bw) between the products calculated by multipliers 24 and 28. Accordingly, and referring once again to Equation No. 5, above, it can be observed that the output data word provided by subtractor 34 is indicative of the solution (designated Sy) of a second 2×2 determinant which defines the vector $\bar{S}$ in homogeneous coordinates.

Each of the output data words from multipliers 25 and 29 is supplied to respective input terminals of subtractor 35. An output data word of approximately 32 bits in length is provided by subtractor 35 and representative of the difference (bz·aw−az·bw) between the products calculated by multipliers 25 and 29. Accordingly, and by once again referring to equation No. 5, above, it can be observed that the output data word provided by subtractor 35 is indicative of the solution (designated Sz) of the third 2×2 determinant which defines the vector $\bar{S}$ in homogeneous coordinates.

Many of the most significant bits of the 32 bit data words provided by subtractors 33-35 are frequently of identical polarity relative to one another. In order to reduce the size of the 32 bit data words (to a representative 16 bits) without sacrificing the information content thereof, each of the 32 bit data words is normalized, according to the technique and by means of the apparatus described while referring herein to FIGS. 5-7. That is, the 32 bit output data words of subtractors 44-46 are applied bit by bit to respective shift registers 36-38. The normalizing logic of FIG. 7 is interconnected with shift registers 36-38, as previously disclosed, so that each of the data words can be normalized to one another. During the first data pass through cross product calculator 10, the contents of shift registers 36-38 are concurrently loaded into respective temporary registers 26-28 whenever the aforementioned particular bit pattern is sensed in any of the 32 bit data words being shifted through registers 36-38. Accordingly, the last sixteen bit word stored in each of the temporary registers 26-28 after the 32 bit data words are shifted through registers 36-38 is the normalized equivalent of the output data words provided by subtractors 34-36. For the purpose of illustration, the sixteen bit normalized numbers stored in temporary registers 26-28 after the first data pass have been referred to above as Sx, Sy and Sz, respectively.

During a second data pass through cross product calculator 10, a new set of sixteen bit words, designated cx, cy, cz and cw and representative of the second of the two points which defines vector $\bar{T}$, is supplied from the bit slice processor to respective input registers 14-17. The sixteen bit words (bx, by, bz and bw) previously stored in input registers 14-17 at the end of the first data pass are transferred to respective intermediate registers 19-22. The sixteen bit words (ax, ay, az and aw) previously stored in intermediate registers 19-22 at the end of the first data pass are discarded therefrom. Moreover, the sixteen bit word bw at intermediate register 22 is loaded into shift register 32, and the sixteen bit word cw at input register 17 is loaded into shift register 31. Shift register 31 supplies the sixteen bit word cw, bit by bit, to each of the input terminals IN of multipliers 23-25. Shift register 32 supplies the sixteen bit word bw, bit by bit, to each of the input terminals IN of multipliers 27-29.

Hence, during the second data pass through cross product calculator 10, multiplier 27 receives input data bw (from shift register 32) and cx (from input register 14). An output data word (designated cx·bw) of approximately 32 bits in length is provided at the output terminal OUT of multiplier 27 and representative of the product of the input data received thereby. Multiplier 23 receives input data cw (from shift register 31) and bx (from intermediate register 19). An output data word (designated bx·cw) of approximately 32 bits in length is provided at the output terminal OUT of multiplier 23 and representative of the product of the input data received thereby. Multiplier 28 receives input data bw (from shift register 32) and cy (from input register 15). An output data word (designated cy·bw) of approximately 32 bits in length is provided at the output terminal OUT of multiplier 28 and representative of the product of the input data received thereby. Multiplier 24 receives input data cw (from shift register 31) and by (from intermediate register 20). An output data word (designated by·cw) of approximately 32 bits in length is provided at the output terminal OUT of multiplier 24 and representative of the product of the input data received thereby. Multiplier 29 receives input data bw (from shift register 32) and cz (from input register 16). An output data word (designated cz·bw) of approximately 32 bits in length is provided at the output terminal OUT of multiplier 29 and representative of the product of the input data received thereby. Multiplier 25 receives input data cw (from shift register 31) and bz (from intermediate register 21). An output data word (designated bz·cw) of approximately 32 bits in length is provided at the output terminal OUT of multiplier 25 and representative of the product of the input data received thereby.

Each of the output data words from multipliers 23 and 27 is supplied to respective input terminals of subtractor 33. An output data word of approximately 32 bits in length is provided by subtractor 33 and representative of the difference (cx·bw−bx·cw) between the products calculated by multipliers 23 and 27. Accordingly, and referring to Equation No. 7, above, it can be observed that the output data word provided by subtractor 33 is indicative of the solution (designated $T_x$) of one 2×2 determinant which defines the vector $\vec{T}$ in homogeneous coordinates.

Each of the output data words from multipliers 24 and 28 is supplied to respective input terminals of subtractor 34. An output data word of approximately 32 bits in length is provided by subtractor 34 and representative of the difference (cy·bw−by·cw) between the products calculated by multipliers 24 and 28. Accordingly, it can be observed from Equation No. 7 that the output data word provided by subtractor 34 is indicative of the solution (designated Ty) of a second 2×2 determinant which defines the vector $\vec{T}$ in homogeneous coordinates.

Each of the output data words from multipliers 25 and 29 is supplied to respective input terminals of subtractor 35. An output data word of approximately 32 bits in length is provided by subtractor 35 and representative of the difference (cz·bw−bz·cw) between the products calculated by multipliers 25 and 29. Accordingly, it can be observed from Equation No. 7 that the output data word provided by subtractor 35 is indicative of the solution (designated Tz) of the third 2×2 determinant which defines the vector $\vec{T}$ in homogeneous coordinates.

Figure 5:
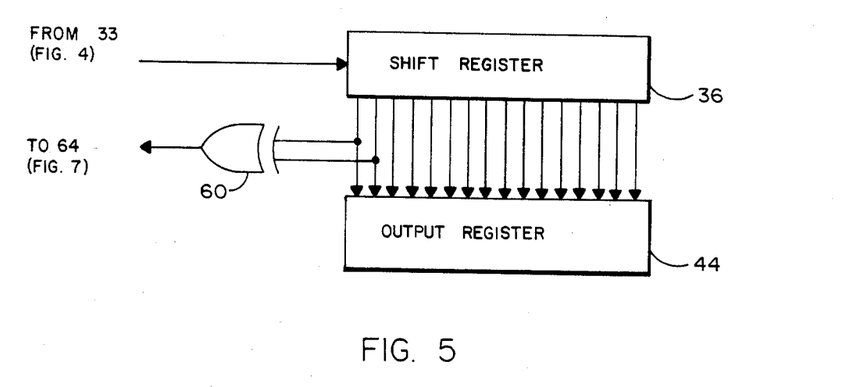
FIG. 5 illustrates apparatus by which to normalize a multiple bit data string within the cross product calculator of FIGS. 3 and 4.

Inasmuch as many of the most significant bits of the 32 bit data words provided by subtractors 33–35 are frequently of identical polarity relative to one another, each of the 32 bit data words are normalized according to the technique and by means of the apparatus described while referring herein to FIGS. 5-7. That is, the 32 bit output data words from subtractors 33–35 are applied bit by bit to respective shift registers 36–38. The normalizing logic of FIG. 7 is interconnected with shift registers 36–38, as previously disclosed, so that each of the data words can be normalized to one another. During the second data pass through cross product calculator 10, the contents of shift registers 36–38 are concurrently loaded into respective shift registers 40–42 whenever the aforementioned particular bit pattern is sensed in any of the 32 bit data words being shifted through registers 36–38. Accordingly, the last sixteen bit word stored in each of the shift registers 40–42 after the 32 bit data words are shifted through registers 36–38 is the normalized equivalent of the output data words provided by subtractors 33–35. For the purpose of illustration, the sixteen bit normalized numbers stored in shift registers 40–42 after the second data pass have been referred to above as Tx, Ty and Tz, respectively.

From Equations 10 and 11, above, it was shown that $\vec{P} = \vec{S} \times \vec{T} = (Px, Py, Pz) = [(Sy·Tz−Sz·Ty), −(Sx·Tz−Sz·Tx), (Sx·Ty−Sy·Tx)]$. However, representations of Sx, Sy and Sz have been calculated during the first data pass through cross product calculator 10 and stored in respective temporary registers 26–28. Representatives of Tx, Ty and Tz have been calculated during the second data pass through cross product calculator 10 and stored in respective shift registers 40–42. Accordingly, the solution to the cross product $\vec{P} = \vec{S} \times \vec{T}$ can be calculated by a third data pass through cross product calculator 10.

More particularly, the sixteen bit normalized numbers designated Sx, Sy and Sz (stored in respective temporary registers 26–28) are copied and loaded into respective intermediate registers 19–21, whereby to overwrite the data bx, by and bz previously stored in intermediate registers 19–21 during the second pass through cross product calculator 10. Hence, during the third data pass through calculator 10, multiplier 27 receives input data Sx (from temporary register 26) and Tz (from shift register 42). An output data word (designated Sx·Tz) of approximately 32 bits in length is provided at the output terminal OUT of multiplier 27 and representative of the product of the input data received thereby. Multiplier 23 receives input data Sx (from intermediate register 19) and Ty (from shift register 41). An output data word (designated Sx·Ty) of approximately 32 bits in length is provided at the output terminal OUT of multiplier 23 and representative of the product of the input data received thereby. Multiplier 28 receives input data Sy (from temporary register 27) and Tz (from shift register 42). An output data word (designated Sy·Tz) of approximately 32 bits in length is provided at the output terminal OUT of multiplier 28 and representative of the product of the input data received thereby. Multiplier 24 receives input data Sy (from intermediate register 20) and Tx (from shift register 40). An output data word (designated Sy·Tx) of approximately 32 bits in length is provided at the output terminal OUT of multiplier 24 and representative of the product of the input data received thereby. Multiplier 29 receives input data Sz (from temporary register 28) and Tx (from shift register 40). An output data word (designated Sz·Tx) of approximately 32 bits in length is provided at the output terminal OUT of multiplier 29 and representative of the product of the input data received thereby. Multiplier 25 receives input data Sz (from intermediate register 21)

and Ty (from shift register 41). An output data word (Sz·Ty) of approximately 32 bits in length is provided at the output terminal OUT of multiplier 25 and representative of the product of the input data received thereby.

In order to compute the cross product $\vec{P}=\vec{S}\times\vec{T}$, each of the output data words from multipliers 28 and 25 is supplied to respective input terminals of subtractor 33. An output data word of approximately 32 bits in length is provided by subtractor 33 and representative of the difference (Sy·Tz−Sz·Ty) between the products calculated by multipliers 28 and 25. Accordingly, and by referring to Equations 9-11, above, it can be observed that the output data word provided by subtractor 33 is indicative of the solution (designated Px) of one $2\times 2$ determinant which defines the resultant vector $\vec{P}$.

Each of the output data words from multipliers 29 and 27 is supplied to respective input terminals of subtractor 34. An output data word of approximately 32 bits in length is provided by subtractor 34 and representative of the difference (Sx·Tz−Sz·Tx) between the products calculated by multipliers 29 and 27. Accordingly, by changing the sign thereof, it can be observed that the output data word provided by subtractor 34 is indicative of the solution (designated Py) of a second $2\times 2$ determinant which defines the resultant vector $\vec{P}$.

Each of the output data words from multipliers 23 and 24 is supplied to respective input terminals of subtractor 35. An output data word of approximately 32 bits in length is provided by subtractor 35 and representative of the difference (Sx·Ty−Sy·Tx) between the products calculated by multipliers 23 and 24. Accordingly, it can be observed that the output data word provided by subtractor 35 is indicative of the solution (designated Pz) of a third $2\times 2$ determinant which defines the resultant vector $\vec{P}$. For purposes of convenience, the Table listed below illustrates the output signals provided by multipliers 23-25 and 27-29 and subtractors 33-35 during each of the three data passes through cross product multiplier 10 in order to calculate the cross product $\vec{P}=\vec{S}\times\vec{T}$.

ized equivalent of the output data words provided by subtractors 33-35. For the example provided herein, the sixteen bit normalized numbers stored in output registers 44-46 after the third data pass have been referred to above as Px, Py and Pz, respectively, so as to define the solution of the cross product operation $\vec{P}=\vec{S}\times\vec{T}$ by a series of three $2\times 2$ determinants.

The normalized sixteen bit numbers stored in output registers 44-46 at the end of the third data pass through cross product calculator 10 are supplied to the bit slice processor by way of the common output data bus 50. Thus, the output of cross product calculator 10 is three sixteen bit numbers which represent the coordinates (x, y, z) and the corresponding direction of the resultant normal vector $\vec{P}$ in three dimensional space relative to a known point of reference (typically 0,0,0). Accordingly, information is assembled by the bit slice processor so as to permit the realistic color shading of a three dimensional object moving across the screen of a video display in a computer graphics system. Inasmuch as the 32 bit data strings at the output of each of the subtractors 33-35 are normalized or scaled relative to one another to produce accurate sixteen bit representations thereof, the hardware and circuitry needed to accomplish the foregoing cross product calculations can be minimized. Moreover, the time to compute the cross product so as to determine the corresponding shading of an object at one position in space can be reduced. Thus, in the event that an object is capable of both translational and rotational movements, thereby requiring numerous high speed calculations for successive determinations of appropriate shadings, the present cross product calculator 10 is capable of advantageously and efficiently making such calculations with a minimum of throughput delay.

It will be apparent that while a preferred embodiment of the invention has been shown and described, various modifications and changes may be made without departing from the true spirit and scope of the invention.

Having thus set forth the preferred embodiment,

TABLE

| DATA PASS | MULTIPLIER 27 | MULTIPLIER 23 | MULTIPLIER 28 | MULTIPLIER 24 | MULTIPLIER 29 | MULTIPLIER 25 | SUBTRACTOR 33 | SUBTRACTOR 34 | SUBTRACTOR 35 |
|---|---|---|---|---|---|---|---|---|---|
| 1 | bx · aw | ax · bw | by · aw | ay · bw | bz · aw | az · bw | bx · aw − ax · bw | by · aw − ay · bw | bz · aw − az · bw |
| 2 | cx · bw | bx · cw | cy · bw | by · cw | cz · bw | bz · cw | cx · bw − bx · cw | cy · bw − by · cw | cz · bw − bz · cw |
| 3 | Sx · Tz | Sx · Ty | Sy · Tz | Sy · Tx | Sz · Tx | Sz · Ty | Sy · Tz − Sz · Ty | −(Sx · Tz − Sz · Tx) | Sx · Ty − Sy · Tx |

Inasmuch as many of the most significant bits of the 32 bit data words provided by subtractors 33-35 are frequently of identical polarity relative to one another, the 32 bit data words are normalized, according to the technique and by means of the apparatus described while referring to FIGS. 5-7. That is, the 32 bit output data words from subtractors 33-35 are applied bit by bit to respective shift registers 36-38. The normalizing logic of FIG. 7 is interconnected with shift registers 36-38, as previously disclosed, so that each of the data words can be normalized to one another. During the third data pass through cross product calculator 10, the contents of shift register 36-38 are concurrently loaded into respective output registers 44-46 whenever the aforementioned particular bit pattern is sensed in any of the 32 bit data words being shifted through registers 36-38. Accordingly, the last sixteen bit word stored in each of the output registers 44-46 after the 32 bit data words are shifted through registers 36-38 is the normal- what is claimed is:

1. A cross product calculator for calculating the cross product of two vectors, where each of said vectors is defined by a pair of points and one of said points is common to both vectors, said cross product calculator comprising:

first register means to receive a coded representation of the coordinates of a first point of a first of said two vectors during a first interval of time, second register means to receive a coded representation of the coordinates of the second point of said first vector during the first time interval, said second point being common to each of said two vectors, a plurality of multiplier means connected to receive output signals from said first and second register means, which output signals are indicative of the contents of said first and second register means during the first time interval, said multiplier means computing the product of said output signals, subtractor means connected to receive signals indicative of the products computed by said multiplier means, said subtractor means subtracting the products provided by certain ones of said multiplier means from the products provided by certain other ones of said multiplier means, and third register means connected to receive output signals from said subtractor means, which output signals are indicative of the differences computed by said subtractor means, said third register means storing therein a partial representation of the cross product of said two vectors.

2. The cross product calculator recited in claim 1, further comprising:

circuit means interconnecting said first and second register means, so that the coded representation at said second register means is supplied to said first register means during a second interval of time to replace the contents of said first register means, said second register means receiving a coded representation of the coordinates of the second point of the second of said two vectors during the second time interval, said plurality of multiplier means receiving output signals from said first and second register means, which output signals are indicative of the contents of said first and second register means during the second time interval, said multiplier means computing the product of said output signals, said subtractor means receiving the products computed by said multiplier means during the second time interval, said subtractor means subtracting the products provided by certain ones of said multiplier means from the products provided by certain other ones of said multiplier means, and fourth register means connected to receive output signals from said subtractor means, which output signals are indicative of the differences computed by said subtractor means during the second time interval, said fourth register means storing therein another partial representation of the cross product of said two vectors.

3. The cross product calculator recited in claim 2, further comprising:

circuit means interconnecting said third register means to said multiplier means, so that a signal indicative of the cross product stored in said third register means is supplied to said multiplier means during a third interval of time, circuit means interconnecting said fourth register means to said multiplier means, so that a signal indicative of the cross product stored in said fourth register means is supplied to said multiplier means during the third time interval, said multiplier means computing the product of the signals supplied thereto during the third time interval from each of said third and fourth register means, said subtractor means receiving the products computed by said multiplier means during the third time interval, said subtractor means subtracting the products provided by certain ones of said multiplier means from the products provided by certain other ones of said multiplier means, and fifth register means connected to receive output signals from said subtractor means, which output signals are indicative of the differences computed by said subtractor means during the third time interval, said fifth register means storing therein a representation of the cross product of said two vectors.

4. The cross product calculator recited in claim 3, wherein said subtractor means comprises a plurality of subtractor means, each one of said plurality of subtractor means interconnected with a respective pair of said plurality of multiplier means, so as to subtract the product provided by one of said pair of multiplier means from the product provided by the other of said pair of multiplier means.

5. The cross product calculator recited in claim 4, further comprising:

a plurality of shift register means each of which being interconnected with corresponding ones of said plurality of subtractor means, each of said shift register means receiving an output signal from a respective one of said subtractor means, said output signal being a multiple bit serial data string, detection means interconnected with each of said plurality of shift register means and responsive to the signal levels of the multiple bit data strings supplied thereto, said detection means generating a signal for causing said plurality of shift register means to concurrently load the contents thereof into either of said third register means during said first time interval, or said fourth register means during said second time interval, or said fifth register means during said third time interval whenever said detection means detects particular predetermined signal levels in any multiple bit data string supplied to one of said shift register means from a corresponding subtractor means, the last data strings loaded into said third, fourth and fifth register means from said plurality of shift register means at the end of said first, second and third time intervals representing the normalized equivalents of said corresponding data strings.

6. The cross product calculator recited in claim 5, wherein each of said shift register means has a bit capacity that is less than the number of bits which form any of the multiple bit data strings supplied thereto from said subtractor means.

7. The cross product calculator recited in claim 6, wherein said third, fourth and fifth register means have the same bit capacity as that of said plurality of shift register means, so that the data strings loaded into said third, fourth and fifth registers means from said shift register means are of shorter length than the corresponding lengths of any of said multiple bit data strings supplied to said shift register means.

8. The cross product calculator recited in claim 7, wherein said plurality of shift register means are interconnected with each of said third, fourth and fifth register means by a number of data lines greater than one, which number of lines corresponds to the bit capacity of said shift register means, and said detection means interconnected with certain ones of said data lines from said shift register means to said third, fourth and fifth register means.

9. The cross product calculator recited in claim 8, wherein said detection means is interconnected with the first two of the data lines which are connected between said shift register means and each of said third, fourth and fifth register means for detecting the signal levels of successive two bit data sets as said multiple bit data strings are shifted through said plurality of shift register means.

10. The cross product calculator recited in claim 9, wherein said detection means is responsive to particular signal levels which form a bit pattern wherein the bits of any successive two bit set of a respective data string are of opposite polarity relative to one another, said detection means generating said signal for causing the contents of said plurality of shift register means to be concurrently loaded into either of said third register means during said first time interval, or said fourth register means during said second time interval, or said fifth register means during said third time interval every time that said detection means detects said bit pattern in any of said data strings supplied to said plurality of shift register means from said plurality of subtractor means.

11. The cross product calculator recited in claim 10, wherein said detection means includes a plurality of 2-input exclusive OR gates, first and second input terminals of said gates respectively connected to first and second data lines between respective ones of said shift register means and said third, fourth and fifth register means for detecting the bit patterns of successive two bit data sets which form the multiple bit data strings being supplied to each of said plurality of shift register means.

12. The cross product calculator recited in claim 11, wherein said detection means further includes signal gating means interconnected with each of said plurality of exclusive OR gates, said signal gating means adapted to generate a LOAD control signal for causing the contents of each of said plurality of shift register means to be concurrently loaded into either of said third, fourth or fifth register means whenever any of said exclusive OR gates detects said particular bit pattern in any successive two bit data set which forms a corresponding multiple bit data stream at any of said shift register means.

13. The cross product calculator recited in claim 12, including a plurality of said signal gating means, each of said plurality of gating means respectively interconnected with said third, fourth and fifth register means for supplying a LOAD control signal thereto, and means by which to selectively energize one of said plurality of signal gating means for supplying said LOAD control signal to said third register means during said first time interval, or to said fourth register means during said second time interval, or to said fifth register means during said third time interval.

14. A calculator for computing the cross product of a pair of vectors, each of said vectors being defined by a pair of points with one of said points being common to each of said vectors, said cross product calculator comprising:

input register means to receive coded representations of the coordinates of a first point of a first of said pair of vectors, the point common to each of said vectors, and the second point of the second of said pair of vectors, a plurality of multiplier means, each of said plurality of multiplier means connected to receive a pair of signals from said input register means that is indicative of the coordinates of the points of said pair of vectors, said multiplier means computing the products of respective pairs of said signals, a plurality of subtractor means, each of said plurality of subtractor means connected to receive signals that are indicative of the products computed by a respective pair of said multiplier means, each of said plurality of subtractor means computing the difference between the product calculated by one of said multiplier means and the product calculated by another of said multiplier means, and a plurality of signal storage means, each of said plurality of storage means connected to receive from a respective one of said subtractor means a signal that is indicative of the difference computed thereby, said storage means storing therein a representation of the cross product of said pair of vectors.

15. The cross product calculator recited in claim 14, further comprising feedback path means interconnected between said storage means and said plurality of multiplier means for providing signals indicative of the contents of said storage means to said multiplier means.

16. The cross product calculator recited in claim 14, further comprising normalizing means including a plurality of output register means interconnected with said storage means to receive signals therefrom, each of said output register means and storage means having an identical capacity which is less than the capacity of said subtractor means, said output register means receiving therein an accurate portion of the cross product representations provided to said storage means from said subtractor means.

* * * * *